US011378243B2

(12) United States Patent
Artner et al.

(10) Patent No.: US 11,378,243 B2
(45) Date of Patent: Jul. 5, 2022

(54) ILLUMINATION DEVICE FOR A MOTOR VEHICLE HEADLIGHT

(71) Applicant: ZKW Group GmbH, Wieselburg (AT)

(72) Inventors: Martin Artner, Maria Taferl (AT);
Johann Roland, Raxendorf (AT);
Maximilian Hahn, Wieselburg/Erlauf (AT)

(73) Assignee: ZKW Group GmbH, Wieselburg (AT)

(*) Notice: Subject to any disclaimer, the term of this patent is extended or adjusted under 35 U.S.C. 154(b) by 0 days.

(21) Appl. No.: 17/312,214

(22) PCT Filed: Nov. 26, 2019

(86) PCT No.: PCT/EP2019/082578
§ 371 (c)(1),
(2) Date: Jun. 9, 2021

(87) PCT Pub. No.: WO2020/120127
PCT Pub. Date: Jun. 18, 2020

(65) Prior Publication Data
US 2022/0018508 A1 Jan. 20, 2022

(30) Foreign Application Priority Data
Dec. 11, 2018 (EP) ..................................... 18211619

(51) Int. Cl.
*F21V 7/04* (2006.01)
*F21S 41/19* (2018.01)
(Continued)

(52) U.S. Cl.
CPC ............ *F21S 41/19* (2018.01); *B60Q 1/0483* (2013.01); *F21S 45/47* (2018.01)

(58) Field of Classification Search
CPC . F21S 41/39; F21S 41/19; F21S 41/29; F21V 17/16; F21V 17/04; F21V 17/06;
(Continued)

(56) References Cited

U.S. PATENT DOCUMENTS

| 2002/0118549 A1 | 8/2002 | Esser et al. | |
| 2008/0259628 A1* | 10/2008 | Lin | F21S 41/28 362/520 |

(Continued)

FOREIGN PATENT DOCUMENTS

| DE | 19650864 A1 * | 6/1998 | ........... B60Q 1/0433 |
| DE | 102012216578 A1 * | 3/2014 | .............. F21S 41/55 |

OTHER PUBLICATIONS

International Search Report for PCT/EP2019/082578, dated Feb. 5, 2020 (12 pages).

(Continued)

*Primary Examiner* — Omar Rojas Cadima
(74) *Attorney, Agent, or Firm* — Eversheds Sutherland (US) LLP

(57) ABSTRACT

The invention pertains to an illumination device (1) for a motor vehicle headlight, wherein said illumination device (1) comprises the following:
an optical assembly (100), which comprises at least one light source and a cooling element (110) that has at least three first openings (111),
a supporting frame (200), which has at least three second openings (210) that are assigned to the at least three first openings (111), and
an adapter component (300), which has a number of dowel pins (310) that corresponds to the number of first openings (111), with the dowel pins (310) respectively having a threaded bore (311) and respectively being inserted into a first opening (111), (Continued)

wherein a screw unit (400) with a mating thread (410) corresponding to the threaded bore (311) is provided for each dowel pin (310), wherein said screw unit (400) penetrates the supporting frame (200) through a second opening (210) of the supporting frame (200) and is screwed into the respective dowel pin (310), and wherein the dowel pins (310) are designed for expanding when a screw unit (400) is screwed into the dowel pin (310) such that the dowel pins (310) inserted into the first openings (111) of the cooling element (110) are frictionally connected to the cooling element (110).

15 Claims, 3 Drawing Sheets

(51) Int. Cl.
*F21S 45/47* (2018.01)
*B60Q 1/04* (2006.01)

(58) Field of Classification Search
CPC .. F21V 17/12; F21V 19/0055; F21V 19/0035; F16B 5/0233; F16B 13/065; F16B 31/00; F16B 5/02; F28F 2275/20; B60Q 1/2626; B60Q 1/2646; B60Q 1/0433
See application file for complete search history.

(56) References Cited

U.S. PATENT DOCUMENTS

| | | |
|---|---|---|
| 2011/0211361 A1 | 9/2011 | Kawamura et al. |
| 2014/0376232 A1* | 12/2014 | Behr ................... F21V 19/0055 |
| | | 362/294 |
| 2016/0040852 A1 | 2/2016 | Zorn |
| 2020/0003387 A1* | 1/2020 | Hess ................... F21V 19/0055 |

OTHER PUBLICATIONS

European Search Report for EP 18 21 1619 dated Jun. 5, 2019 (8 pages).

* cited by examiner

ILLUMINATION DEVICE FOR A MOTOR VEHICLE HEADLIGHT

The invention pertains to an illumination device for a motor vehicle headlight.

The invention furthermore pertains to a motor vehicle headlight with at least one inventive illumination device.

One or more illumination devices usually can be provided and are solitarily or jointly mounted on a supporting frame, wherein said supporting frame is subsequently installed in a motor vehicle headlight.

In order to mechanically connect the illumination device to the supporting frame, it is known from the prior art to mount the illumination device by means of screws, which are screwed into the cooling element of the illumination device through the supporting frame.

Cooling elements of an illumination device usually are made of metal or light metal such as aluminum. In order to screw the screws into the cooling element, it is common practice, among other things, to pre-drill bore holes or bores such that metallic abrasion in the form of metal chips is formed.

This type of contamination is undesirable in an illumination device or in a motor vehicle headlight because such metal chips can lead, for example, to defects of electronic equipment within the headlight or the like.

Furthermore, the above-mentioned bores have to meet strict tolerance requirements because motor vehicle headlights can during the operation of the vehicle be subjected to vibrations that can lead to screws, which are not firmly tightened, to loosen again.

The invention is based on the objective of making available an improved illumination device.

This objective is attained in that the illumination device comprises the following:
- an optical assembly, which comprises at least one light source and a cooling element that is assigned to the at least one light source and has at least three first openings, wherein the optical assembly is designed for projecting a light pattern in front of the motor vehicle headlight,
- a supporting frame, which has at least three second openings that are assigned to the at least three first openings of the cooling element, and
- an adapter component, which has a number of dowel pins that corresponds to the number of first openings of the cooling element, with said dowel pins corresponding to the first openings, and with the dowel pins respectively having a threaded bore and respectively being inserted into a first opening of the cooling element, wherein a screw unit with a mating thread corresponding to the threaded bore is provided for each dowel pin, wherein said screw unit penetrates the supporting frame through a second opening of the supporting frame and is screwed into the respective dowel pin, and wherein the dowel pins are designed for expanding when a screw unit is screwed into the dowel pin such that the dowel pins inserted into the first openings of the cooling element are frictionally connected to the cooling element and the optical assembly is mounted on the supporting frame by means of the adapter component.

The cooling element advantageously has exactly three first openings.

It may be advantageous that the supporting frame has precisely three second openings.

It may be advantageous if the cooling element is made of metal, preferably of aluminum.

The adapter component may be made of plastic.

The adapter component may be respectively realized integrally or in one piece.

In this way, the adapter component can be manufactured more easily, for example, by means of injection molding processes.

The dowel pins may advantageously comprise at least one respective catch element, wherein the at least one catch element is designed for engaging into a mating catch element that is assigned to the catch element and provided in the first openings of the cooling element.

In this way, the dowel pins are prevented from being inadvertently pushed out of the first openings of the cooling element before the screw units are screwed in.

The at least one catch element may be realized in the form of a catch projection or in the form of an undercut.

The mating catch element may be realized in the form of a catch projection or in the form of an undercut.

The catch element and the dowel pin may be respectively realized integrally or in one piece.

A respective screw unit may advantageously comprise a screw, which has the mating thread and a screw head, and a bearing element, wherein the screw head is rotatably supported in the bearing element, and wherein the bearing element is arranged in a second opening of the supporting frame.

In this case, the bearing element may be supported in the second opening in a fixed or rotatable manner.

The second openings of the supporting frame may be advantageously arranged in such a way that imaginary connecting lines between the second openings of the supporting frame form a rectangular triangle, preferably an isosceles rectangular triangle.

In an installed state of the illumination device in a motor vehicle headlight, which is properly mounted in a motor vehicle, these imaginary connecting lines correspond, for example, to a horizontal and a vertical pivoting axis.

In this context, the terms "vertical" and "horizontal" refer to an illumination device that is installed in a motor vehicle headlight, wherein the motor vehicle headlight is properly installed in a motor vehicle.

The optical assembly may be designed for projecting an auxiliary high beam spot in front of the illumination device.

The above-defined objective is also attained by means of a motor vehicle headlight with at least one inventive illumination device.

The invention is described in greater detail below with reference to exemplary drawings. In these drawings, FIG. 1 shows an exemplary illumination device with an optical assembly, which is mounted on a supporting frame by means of an adapter component;

Figure 1:
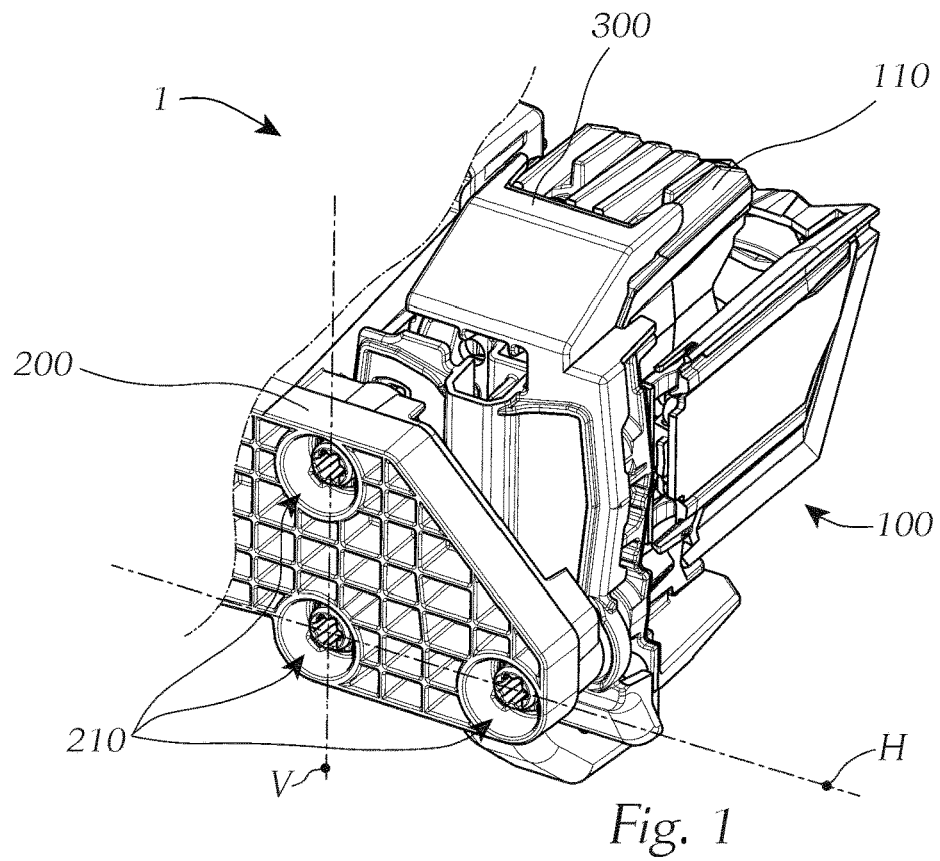

FIG. 1 shows an exemplary illumination device 1 for a motor vehicle headlight, wherein said illumination device 1 comprises an optical assembly 100, which in turn comprises at least one light source and a cooling element 110 that is assigned to the at least one light source, wherein the cooling element 110 has three first openings and is made, for example, of metal, particularly of aluminum. The optical assembly 100 is designed for projecting a light pattern in front of a motor vehicle headlight.

Figure 2:
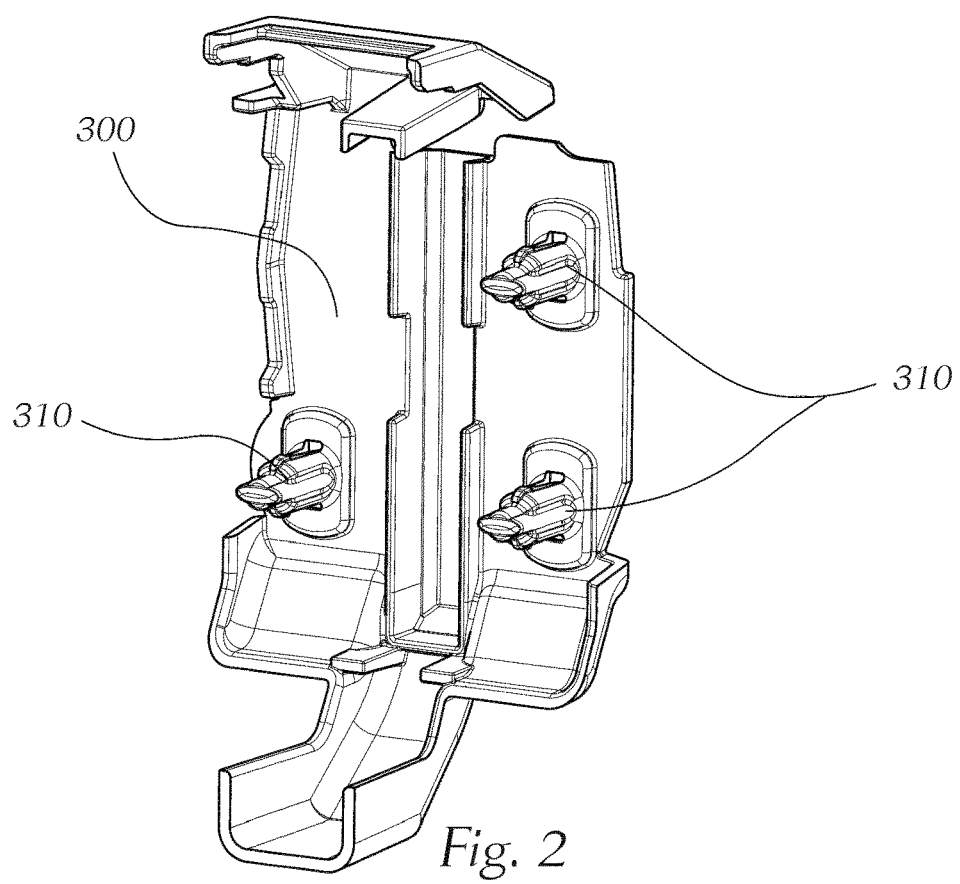
FIG. 2 shows the adapter component according to FIG. 1 in the form of a perspective view, wherein the adapter component comprises three dowel pins.
Figure 3:
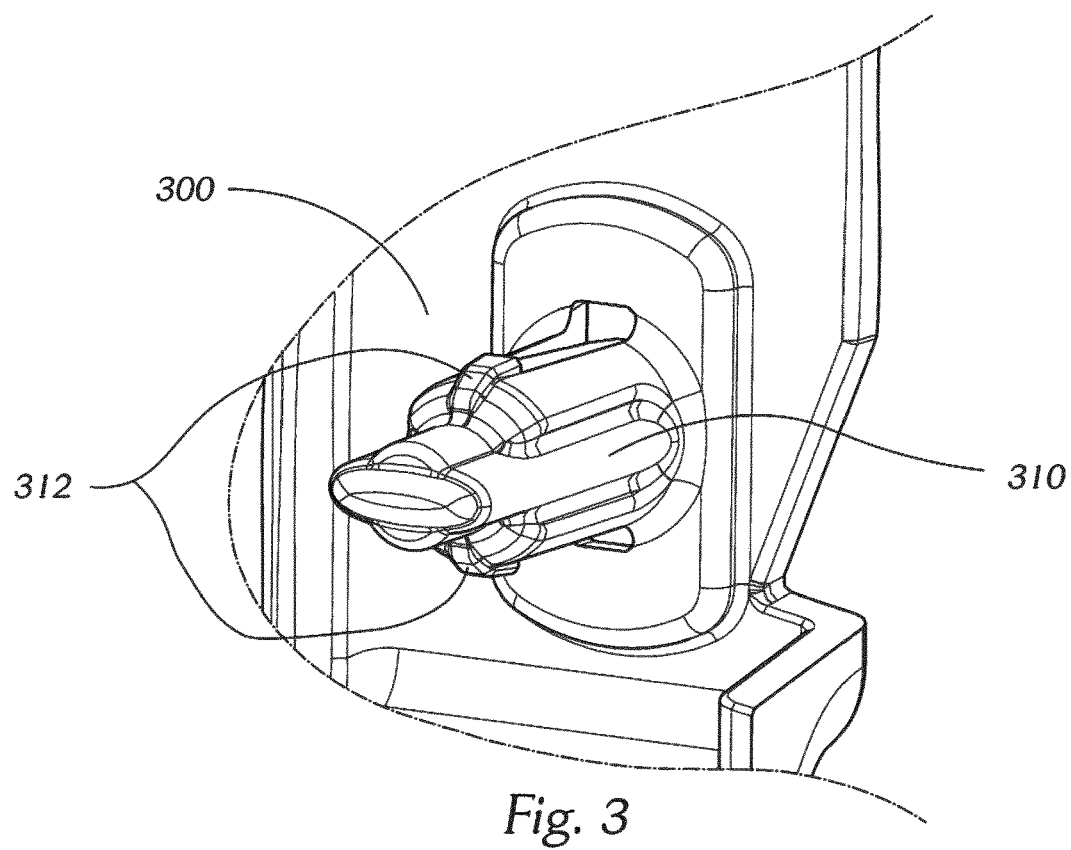
FIG. 3 shows a detailed view of a dowel pin according to FIG. 2.
Figure 4:
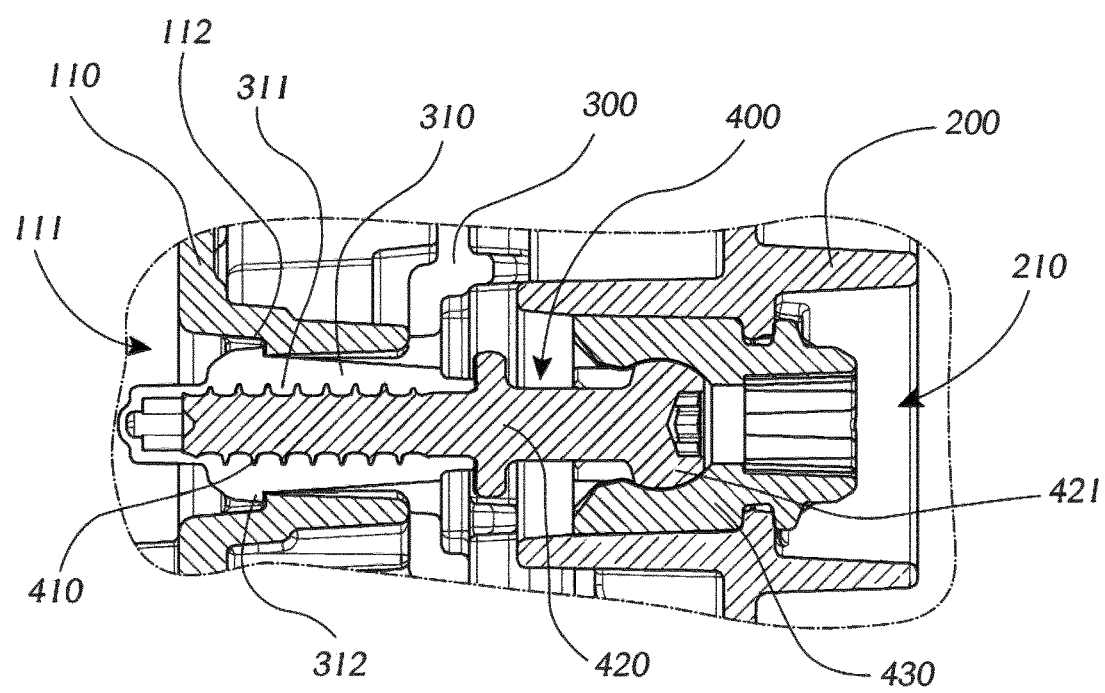
FIG. 4 shows a detailed cross-sectional view of the connecting point between the optical assembly, the adapter component and the supporting frame, wherein a dowel pin is arranged in a first opening of a cooling element of the optical assembly and engaged with the first opening by means of catch elements.
Figure 5:
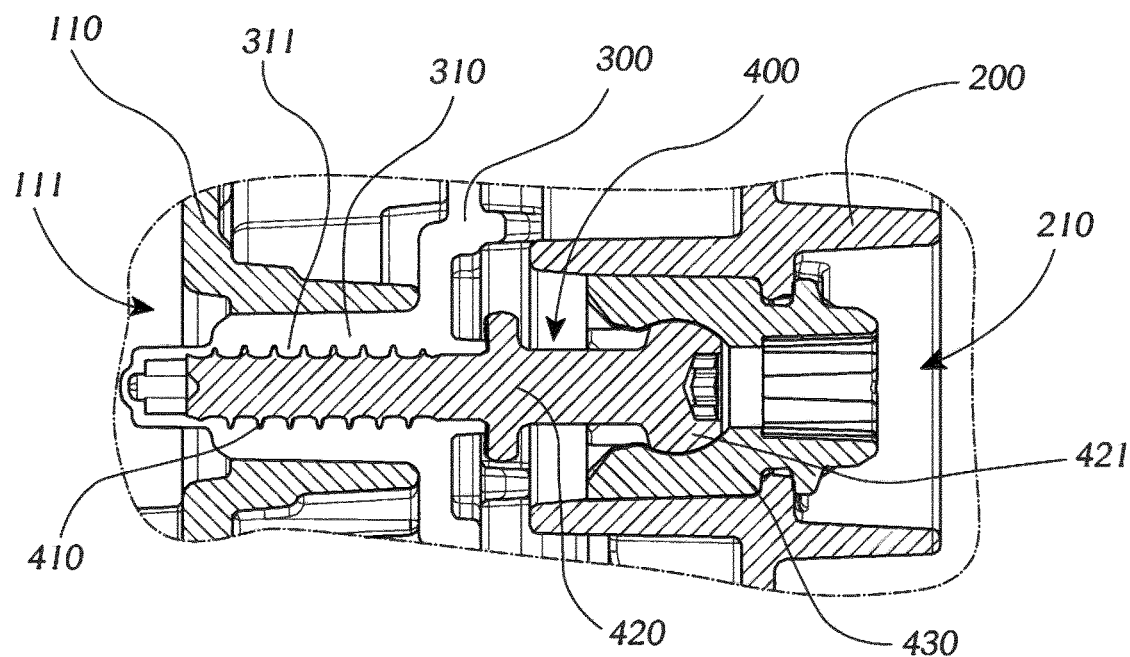
FIG. 5 shows another detailed view of an exemplary dowel pin of the adapter component without catch elements.
Figure 6:
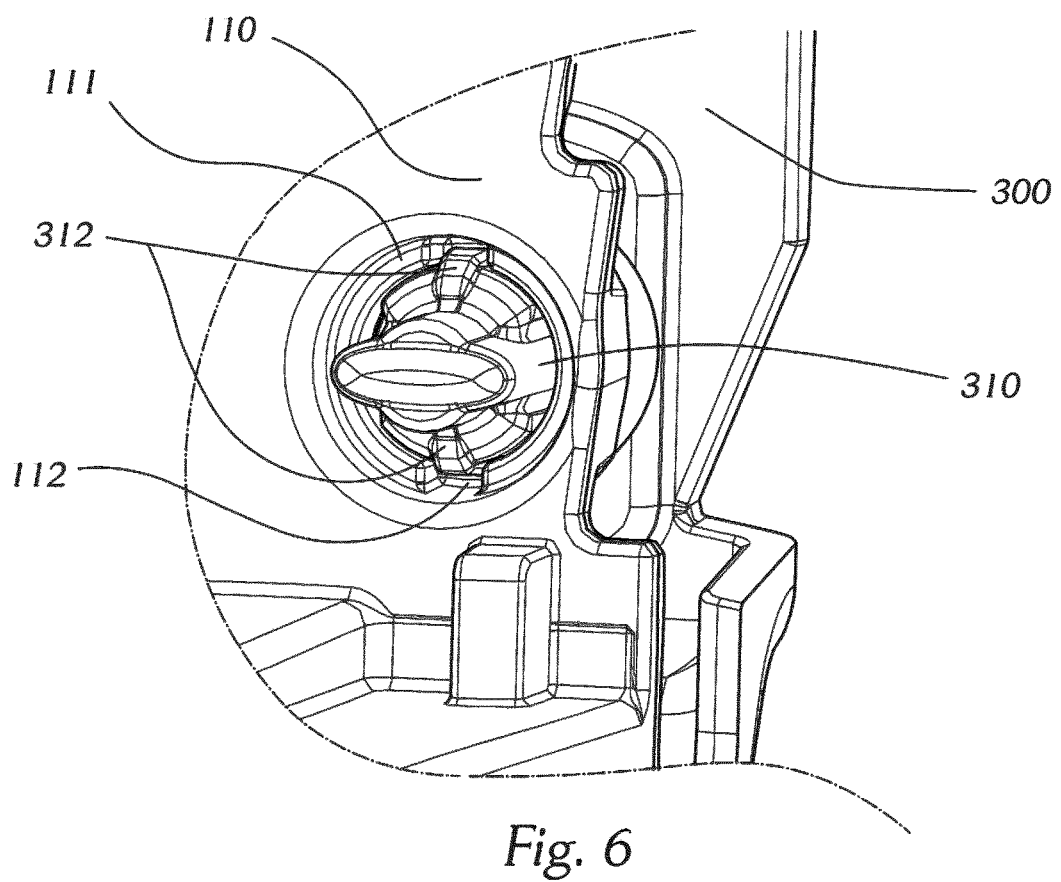
FIG. 6 shows a perspective detailed view of the connecting point of a dowel pin of the adapter component, which is connected to the optical assembly.

The illumination device 1 furthermore comprises a supporting frame 200, which has three second openings 210, wherein said second openings 210 are respectively assigned to a first opening of the cooling element, as well as an adapter component 300, which has a number of dowel pins 310 that corresponds to the number of first openings of the cooling element, wherein said dowel pins correspond to the first openings and are illustrated in FIGS. 2, 3 and 6, as well as in the form of a cross section in FIGS. 4 and 5. In the example illustrated in FIG. 2, the adapter component 300 is made of plastic and respectively realized integrally or in one piece with the dowel pin 310, for example, by means of injection molding processes.

FIG. 3 shows a detailed view of a dowel pin 310 of the adapter component 300, wherein this figure shows that the dowel pin additionally has two catch elements 312.

FIG. 4 and FIG. 5 represent exemplary embodiments of the dowel pins and show that the dowel pins 310 respectively have a threaded bore 311 and are respectively inserted into a first opening 111 of the cooling element 110, wherein a screw unit 400 with a mating thread 410 corresponding to the threaded bore 311 is provided for each dowel pin 310.

This screw unit 400 comprises a screw 420, which has the mating thread 410 and a screw head 421, and a bearing element 430, wherein the screw head 421 is rotatably supported in the bearing element 430. In this case, the bearing element 430 is arranged in a second opening 210 of the supporting frame 200.

Furthermore, the corresponding screw units 400 penetrate the supporting frame 200 through the second openings 210 of the supporting frame 200 and are at least partially screwed into the respective dowel pin 310, wherein the dowel pins 310 are designed for expanding when the screw unit 400 is screwed into the dowel pin 310 or the mating thread 410 is screwed into the corresponding threaded bore 311 such that the dowel pins 310 inserted into the first openings 111 of the cooling element 110 are frictionally connected to the cooling element 110 and the optical assembly 100 is mounted on the supporting frame 200 by means of the adapter component 300.

For example, the adapter component 300 is fitted on the cooling element 110 of the optical assembly 100, wherein the dowel pins 310 are inserted into the first openings 111 of the cooling element 110 provided for this purpose. FIG. 4, as well as FIG. 3, furthermore shows that the dowel pin 310 or the dowel pins 310 respectively comprise at least one catch element 312 in the form of a catch projection, wherein the catch element 312 is designed for engaging into a mating catch element 112 in the form of an undercut, which is assigned to the catch element 312 and provided in the first openings 111 of the cooling element 110. When the dowel pins 310 are inserted into the first openings 111, the catch elements 312 engaging into the mating catch elements 112 prevent the dowel pins 310 from being inadvertently pushed out before the screw units 400 are screwed in.

The respective screw units 400 or the screws 420, which are respectively located in the second openings 210 of the supporting frame 200 or penetrate this supporting frame through the second openings 210, are subsequently screwed into the corresponding dowel pins 310. The optical assembly 100 is thereby connected to the supporting frame 200, wherein the orientation of the optical assembly 100 on the supporting frame 200 is defined by the screw-in depth of the screw units 400 into the respective dowel pin 310, i.e. the optical assembly 100 can, for example, be tilted or slightly rotated depending on the screw-in depth into the different dowel pins 310.

In this respect, FIG. 6 shows an exemplary connecting point according to FIG. 4 in the form of a perspective view, wherein the dowel pin 310 inserted into the first opening 111 of the cooling element 110 is engaged with the undercuts 112 of the first opening 111 by means of the catch elements 312.

Since the screw head 421 of the screw 420 is only rotatably supported in the bearing element 430 and the bearing element 430 itself is also arranged in the second openings 210 in either a fixed or at least rotatable manner, the optical assembly 100 is moved by screwing in and/or screwing out the screws 420 in the threaded bores 311. In this case, the supporting frame is installed relative to the optical assembly 100, for example, in a motor vehicle headlight.

The second openings 210 of the supporting frame or all first and second openings 111, 210 respectively are arranged in such a way that imaginary connecting lines between the respective second openings 210 or first openings 111 form a rectangular triangle, preferably an isosceles rectangular triangle. In an installed state of the illumination device in a motor vehicle headlight, which is properly mounted in a motor vehicle, these imaginary connecting lines correspond, for example, to a horizontal pivoting axis H and a vertical pivoting axis V that are illustrated in FIG. 1.

In this context, the terms "vertical" and "horizontal" refer to an illumination device 1 that is installed in a motor vehicle headlight, wherein the motor vehicle headlight is properly installed in a motor vehicle.

LIST OF REFERENCE SYMBOLS

Illumination device . . . 1
Optical assembly . . . 100
Cooling element . . . 110
First opening . . . 111
Mating catch element . . . 112
Supporting frame . . . 200
Second opening . . . 210
Adapter component . . . 300
Dowel pin . . . 310
Threaded bore . . . 311
Catch element . . . 312
Screw unit . . . 400
Mating thread . . . 410
Screw . . . 420
Screw head . . . 421
Bearing element . . . 430

The invention claimed is:
1. An illumination device (1) for a motor vehicle headlight, the illumination device (1) comprising:
an optical assembly (100), which comprises at least one light source and a cooling element (110) that is assigned to the at least one light source and has at least three first openings (111), wherein the optical assembly (100) is designed for projecting a light pattern in front of the motor vehicle headlight;

a supporting frame (200), which has at least three second openings (210) that are assigned to the at least three first openings (111) of the cooling element (110); and an adapter component (300), which has a number of dowel pins (310) that corresponds to the number of first openings (111) of the cooling element (110), with said dowel pins corresponding to the first openings (111), and with the dowel pins (310) respectively having a threaded bore (311) and respectively being inserted into one opening of the at least three first openings (111) of the cooling element (110), wherein a screw unit (400) with a mating thread (410) corresponding to the threaded bore (311) is provided for each dowel pin (310), wherein said screw unit (400) penetrates the supporting frame (200) through one opening of the at least three second openings (210) of the supporting frame (200) and is screwed into the respective dowel pin (310), and wherein the dowel pins (310) are designed for expanding when a screw unit (400) is screwed into the dowel pin (310) such that the dowel pins (310) inserted into the first openings (111) of the cooling element (110) are frictionally connected to the cooling element (110) and the optical assembly (100) is mounted on the supporting frame (200) by means of the adapter component (300), and wherein the dowel pins (310) respectively comprise at least one catch element (312), wherein the at least one catch element (312) is configured to engage into a mating catch element (112) that is assigned to the at least one catch element (312) and provided in the first openings (111) of the cooling element (110).

2. The illumination device according to claim 1, wherein the cooling element (110) has exactly three first openings (111).

3. The illumination device according to claim 1 wherein the supporting frame (200) has exactly three second openings (210).

4. The illumination device according to claim 1, wherein the cooling element (110) is made of metal.

5. The illumination device according to claim 4, wherein the metal is aluminum.

6. The illumination device according to claim 1, wherein the adapter component (300) is made of plastic.

7. The illumination device according to claim 1, wherein the adapter component (300) is respectively realized integrally or in one piece.

8. The illumination device according to claim 1, wherein the at least one catch element (312) is realized in the form of a catch projection or in the form of an undercut.

9. The illumination device according to claim 1, wherein the mating catch element (112) is realized in the form of a catch projection or in the form of an undercut.

10. The illumination device according to claim 1, wherein the catch element (312) and the dowel pin (310) are respectively realized integrally or in one piece.

11. The illumination device according to claim 1, wherein a respective screw unit (400) comprises a screw (420), which has the mating thread (410) and a screw head (421), and a bearing element (430), wherein the screw head (421) is rotatably supported in the bearing element (430), and wherein the bearing element (430) is arranged in a second opening (210) of the supporting frame (200).

12. The illumination device according to claim 1, wherein the second openings (210) of the supporting frame (200) are arranged in such a way that imaginary connecting lines between the second openings (210) of the supporting frame (200) form a rectangular triangle.

13. The illumination device according to claim 12, wherein the rectangular triangle is an isosceles rectangular triangle.

14. The illumination device according to claim 1, wherein the optical assembly (100) is designed for projecting an auxiliary high beam spot in front of the illumination device (1).

15. A motor vehicle headlight with at least one illumination device (1) according to claim 1.

\* \* \* \* \*